United States Patent
Atzmony et al.

(10) Patent No.: US 11,336,438 B2
(45) Date of Patent: May 17, 2022

(54) REMOTE APPROVAL AND EXECUTION OF RESTRICTED OPERATIONS

(71) Applicant: EMC IP Holding Company LLC, Hopkinton, MA (US)

(72) Inventors: Yedidia Atzmony, Zichron Yaakov (IL); Yoav Nir, Zikhron Ya'Akov (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 153 days.

(21) Appl. No.: 16/835,475

(22) Filed: Mar. 31, 2020

(65) Prior Publication Data

US 2021/0306140 A1    Sep. 30, 2021

(51) Int. Cl.
*H04L 9/08* (2006.01)
*H04L 29/06* (2006.01)
*H04L 9/32* (2006.01)

(52) U.S. Cl.
CPC ............ *H04L 9/085* (2013.01); *H04L 9/3234* (2013.01); *H04L 9/3247* (2013.01); *H04L 63/08* (2013.01)

(58) Field of Classification Search
CPC ..... H04L 9/085; H04L 9/3234; H04L 9/3247; H04L 63/08; H04L 63/123; H04L 63/0807
See application file for complete search history.

(56) References Cited

U.S. PATENT DOCUMENTS

| | | | | |
|---|---|---|---|---|
| 5,196,840 A | * | 3/1993 | Leith | G06Q 20/4012 340/5.26 |
| 5,485,519 A | * | 1/1996 | Weiss | G06F 21/31 713/185 |
| 6,173,400 B1 | * | 1/2001 | Perlman | G06F 21/34 380/255 |
| 6,826,686 B1 | * | 11/2004 | Peyravian | G06F 21/31 713/168 |
| 9,565,020 B1 | * | 2/2017 | Camenisch | H04L 63/0815 |
| 10,110,385 B1 | * | 10/2018 | Rush | H04L 9/3297 |
| 10,956,560 B1 | * | 3/2021 | Sanchez | H04L 9/0662 |
| 10,979,226 B1 | * | 4/2021 | Billings | H04L 9/30 |
| 2003/0204732 A1 | * | 10/2003 | Audebert | H04L 9/3226 713/182 |
| 2003/0226017 A1 | * | 12/2003 | Palekar | H04L 63/08 713/168 |
| 2005/0068983 A1 | * | 3/2005 | Carter | H04L 63/102 370/480 |

(Continued)

*Primary Examiner* — Aravind K Moorthy
(74) *Attorney, Agent, or Firm* — Ryan, Mason & Lewis, LLP

(57) ABSTRACT

Techniques are provided for approval and execution of restricted operations. One method comprises receiving a request to perform an operation from a user; providing a redirect request with a protected request to obtain approval from an approval system; receiving a protected request approval with the protected request that was generated by the approval system using a shared secret; comparing the received protected request to a regenerated request generated using information stored with the request; and initiating an execution of the operation in response to the comparing satisfying one or more approval criteria. The shared secret may be shared between an operation execution system and the approval system. The processing of the request, an approval result and/or the execution of the operation can be audited.

20 Claims, 11 Drawing Sheets

(56) References Cited

U.S. PATENT DOCUMENTS

| | | | |
|---|---|---|---|
| 2006/0064588 A1* | 3/2006 | Tidwell | H04L 41/5067 713/169 |
| 2007/0050630 A1* | 3/2007 | Kumar | H04L 63/08 713/182 |
| 2007/0101152 A1* | 5/2007 | Mercredi | G06F 21/34 713/185 |
| 2008/0005577 A1* | 1/2008 | Rager | H04W 12/106 713/183 |
| 2009/0300364 A1* | 12/2009 | Schneider | H04L 9/3247 713/178 |
| 2010/0131755 A1* | 5/2010 | Zhu | H04L 63/0815 713/155 |
| 2010/0231355 A1 | 9/2010 | Okuma et al. | |
| 2011/0131415 A1* | 6/2011 | Schneider | H04L 63/0853 713/171 |
| 2013/0097427 A1* | 4/2013 | Billings | H04L 9/3273 713/182 |
| 2013/0174231 A1* | 7/2013 | Stavropoulos | H04L 63/0428 726/5 |
| 2014/0064482 A1* | 3/2014 | Sin | H04L 9/0891 380/44 |
| 2014/0281574 A1* | 9/2014 | Webb | G06F 21/602 713/189 |
| 2015/0067341 A1* | 3/2015 | Deen | H04L 63/123 713/176 |
| 2015/0244716 A1* | 8/2015 | Potlapally | H04L 63/12 713/155 |
| 2015/0295720 A1* | 10/2015 | Buldas | H04L 9/3263 713/176 |
| 2015/0350171 A1* | 12/2015 | Brumley | H04L 63/061 713/170 |
| 2016/0057125 A1* | 2/2016 | Li | H04L 63/0853 713/168 |
| 2016/0191494 A1* | 6/2016 | Claes | H04L 63/0853 713/159 |
| 2017/0168776 A1* | 6/2017 | Boenisch | G06F 7/588 |
| 2017/0272245 A1* | 9/2017 | Norton | H04L 9/0894 |
| 2017/0324561 A1* | 11/2017 | Shekh-Yusef | H04L 9/006 |
| 2017/0346809 A1* | 11/2017 | Plotnik | H04L 63/1441 |
| 2018/0124600 A1* | 5/2018 | Chen | H04L 9/0844 |
| 2018/0173891 A1* | 6/2018 | Wang | H04L 63/083 |
| 2018/0211049 A1* | 7/2018 | Kelso | H04L 9/0897 |
| 2019/0028485 A1* | 1/2019 | Baird | H04L 63/083 |
| 2019/0149526 A1* | 5/2019 | He | H04L 9/0894 713/168 |
| 2019/0305942 A1* | 10/2019 | Cambou | H04L 9/3271 |
| 2019/0306157 A1* | 10/2019 | Lores | H04L 9/3247 |
| 2019/0327080 A1* | 10/2019 | Liu | G06F 21/6218 |
| 2019/0349753 A1* | 11/2019 | Chen | H04L 9/0643 |
| 2020/0007345 A1* | 1/2020 | Barry | G06F 16/2365 |
| 2020/0021448 A1* | 1/2020 | Chumbley | H04L 9/0825 |
| 2020/0052903 A1* | 2/2020 | Lam | H04L 9/3218 |
| 2020/0169406 A1* | 5/2020 | Liu | H04L 9/08 |
| 2020/0186333 A1* | 6/2020 | Schubert | H04L 9/14 |
| 2020/0235931 A1* | 7/2020 | Klaiber | G06F 21/34 |
| 2020/0272706 A1* | 8/2020 | Roberts | H04L 67/147 |
| 2020/0295939 A1* | 9/2020 | Matovsky | H04L 9/0819 |
| 2020/0389499 A1* | 12/2020 | Koval | H04L 9/3247 |
| 2020/0396092 A1* | 12/2020 | Cambou | H04L 9/3278 |
| 2020/0412539 A1* | 12/2020 | Uy | H04L 9/30 |
| 2021/0006548 A1* | 1/2021 | Zhang | H04L 63/12 |
| 2021/0064778 A1* | 3/2021 | Vladimerou | H04L 63/0428 |
| 2021/0110027 A1* | 4/2021 | Stohr | H04W 12/06 |
| 2021/0243026 A1* | 8/2021 | Mohassel | H04L 9/3239 |
| 2021/0266177 A1* | 8/2021 | Sczepczenski | H04L 63/08 |

* cited by examiner

REMOTE APPROVAL AND EXECUTION OF RESTRICTED OPERATIONS

FIELD

The field relates generally to information processing systems and, more particularly, to techniques for the processing of operations.

BACKGROUND

Some systems may require a user desiring to perform certain operations, often referred to as restricted operations, to first obtain approval from one or more separate entities. For example, in the context of a storage system, a user may be required to obtain an approval before deleting a storage volume. A need exists for improved techniques for processing restricted operations.

SUMMARY

In one embodiment, a method comprises receiving a request to perform an operation from a user; providing a redirect request with a protected request to obtain approval to perform the operation from an approval system, wherein the protected request comprises a random token combined with user authentication information that is protected using one or more of an encryption and a digital signature with a shared secret; receiving a protected request approval with the protected request, wherein the protected request approval was generated by the approval system using the shared secret; comparing the received protected request to a regenerated request generated using the user authentication information and one or more of the encryption and the digital signature with the shared secret; and initiating an execution of the operation in response to the comparing satisfying one or more approval criteria.

In some embodiments, the shared secret is shared between an operation execution system and the approval system. In one or more embodiments, one or more of the processing of the request to perform an operation, a result of the approval and the execution of the operation are audited.

Other illustrative embodiments include, without limitation, apparatus, systems, methods and computer program products comprising processor-readable storage media.

DETAILED DESCRIPTION

Figure 1:
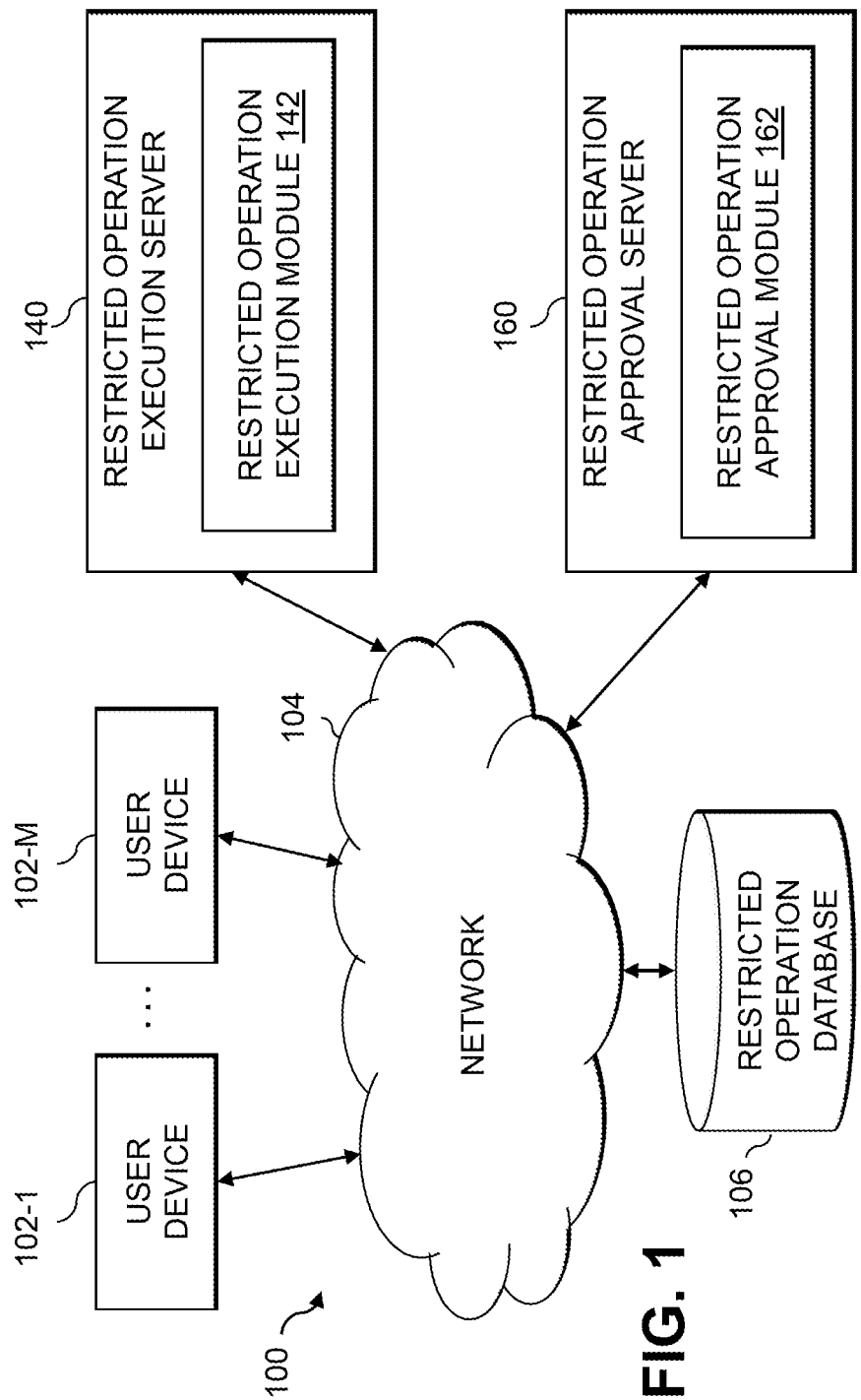
FIG. 1 shows a computer network configured in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for approval and execution of restricted operations. As used herein, the term "restricted operation" shall be broadly construed to include any operation requiring approval by another entity. In an exemplary storage system implementation, restricted operations include, for example, requests to: delete a storage volume, add and/or delete one or more users, remove one or more snapshots, approve a replication and map a volume.

In one or more embodiments, techniques are provided that allow a user to submit a request to perform a restricted operation on an execution system and to receive an approval key, such as a one-time approval key, from an approval system. The approval key can be used by the requesting user to resubmit the requested restricted operation to the execution system for execution of the restricted operation by the execution system. In this manner, the execution of the restricted operation is approved only for the person performing the operation. In other embodiments, a first user may submit the request, and the first user or another user may receive the approval key. The first user or another user may then resubmit the requested restricted operation to the execution system with the approval key. In some embodiments, the execution of the operation on the execution system is audited by the execution system.

Thus, in an embodiment, a user desiring to perform a restricted operation submits a request to a remote approval entity for approval to perform the restricted operation. The remote approval entity evaluates the request to determine whether the request should be approved. If the remote approval entity approves the request, the user receives the approval and submits the protected request approval for execution of the restricted operation by a remote execution entity.

A secret may be shared between the restricted operation execution system and the restricted operation approval system (for example, the shared secret may comprise a symmetric key or an asymmetric key pair). When a user would like to perform a restricted operation on the restricted operation execution system, the user will be authenticated by the restricted operation execution system in some embodiments, and then the user requests to perform a restricted operation. In return, the restricted operation execution system may ask the user to submit an authentication factor, such as passphrase known only to the user, a fingerprint, a smart card or another authentication factor.

Once the passphrase or other authentication factor is received by the restricted operation execution system, the restricted operation execution system will generate a protected request (such as, for example, a number or a user identifier) and the restricted operation execution system will combine the authentication factor and the protected request into a combined token, such as (but not limited to) using a hash-based message authentication code (HMAC). The restricted operation execution system will register (at least), in one or more embodiments, the user, the restricted operation, and the generated protected request, for example, in a restricted operation database.

In at least some embodiments, the disclosed restricted operation execution server will take the input parameters, combine them in a specified format and protect them using the shared key to generate a protected request. The protection of the request may be done by encrypting or signing the request using the pre-shared key or by any other means known to a person of ordinary skill in the art. The user receives the protected request (e.g., in the form of a redirection) and submits the protected request to a restricted operation approval server. The exemplary restricted operation approval server evaluates the protected request message, adds an approval message and provides a protected request approval message (using methods described for the request) back to the user.

In some embodiments of the disclosure, the user will then go back to the restricted operation execution server, submit the protected approval message and enter the previously chosen authentication factor. The restricted operation execution server will decrypt the protected approval message to confirm that the protected approval message was approved by the restricted operation approval server, combine the passphrase with the user authentication information supplied by the user as well as the previously generated protected request to confirm that the passphrase is the same passphrase that was initially submitted and then perform the restricted operation if one or more predefined approval criteria are satisfied.

FIG. 1 shows a computer network (also referred to herein as an information processing system) 100 configured in accordance with an illustrative embodiment. The computer network 100 comprises a plurality of user devices 102-1 . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 are restricted operation execution server 140 and restricted operation approval server 160.

The user devices 102 may comprise, for example, cameras and/or sensors (e.g., three-dimensional (3D) depth sensor cameras), as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The user devices 102 may further comprise a network client (not shown in FIG. 1) that can include networking capabilities such as ethernet, Wi-Fi, etc.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, one or more of the restricted operation execution server 140 and the restricted operation approval server 160 can have one or more associated restricted operation databases 106 configured to store restricted operation data pertaining to the user, the restricted operation, and/or the generated protected request or other security parameters, etc.

The database(s) 106 in the present embodiment is implemented using one or more storage systems associated with (or a part of and/or local to) the restricted operation execution server 140 and/or the restricted operation approval server 160. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the restricted operation execution server 140 and/or the restricted operation approval server 160 can be one or more input-output devices, which illustratively comprise keyboards, displays or other types of input-output devices in any combination. Such input-output devices can be used, for example, to support one or more user interfaces to the restricted operation execution server 140 and the restricted operation approval server 160, as well as to support communication between the restricted operation execution server 140 and the restricted operation approval server 160 and other related systems and devices not explicitly shown.

One or more of the restricted operation execution server 140 and the restricted operation approval server 160 may be implementation using a cluster of servers (e.g., for redundancy or other purposes).

The user devices 102, the restricted operation execution server 140 and the restricted operation approval server 160 in the FIG. 1 embodiment are assumed to be implemented using at least one processing device. Each such processing device generally comprises at least one processor and an associated memory, and implements one or more functional modules for controlling certain features of the restricted operation execution server 140 and/or the restricted operation approval server 160.

More particularly, user devices 102, restricted operation execution server 140 and restricted operation approval server 160 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the user devices 102, restricted operation execution server 140 and/or the restricted operation approval server 160 to communicate over the network 104 with each other (as well as one or more other networked devices), and illustratively comprises one or more conventional transceivers.

As also depicted in FIG. 1, the restricted operation execution server 140 further comprises a restricted operation execution module 142 and the restricted operation approval server 160 comprises a restricted operation approval module 162. It is to be appreciated that this particular arrangement of modules 142 and 162 illustrated in the restricted operation execution server 140 and the restricted operation approval server 160, respectively, of the FIG. 1 embodiment is presented by way of example only, and alternative arrangements can be used in other embodiments. For example, the functionality associated with modules 142 and 162 in other embodiments can be combined into a single module, or separated across a larger number of modules. As another example, multiple distinct processors can be used to implement different ones of modules 142 and 162 or portions thereof.

At least portions of modules 142 and 162 may be implemented at least in part in the form of software that is stored in memory and executed by a processor.

It is to be understood that the particular set of elements shown in FIG. 1 for approval and execution of restricted operations involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

Exemplary processes utilizing modules 142 and 162 of exemplary restricted operation execution server 140 and restricted operation approval server 160, respectively, in computer network 100 will be described in more detail with reference to the flow diagram of FIGS. 3 through 9.

Figure 2:
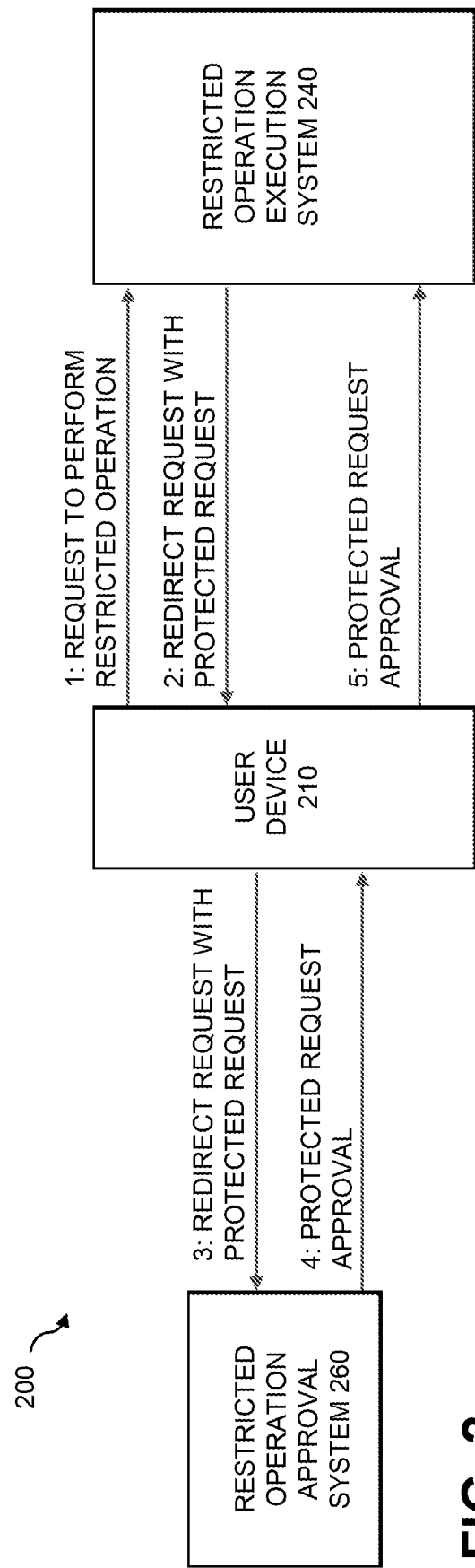
FIG. 2 illustrates an exemplary environment for approval and execution of restricted operations submitted by a user device, according to one or more embodiments of the disclosure.

FIG. 2 illustrates an exemplary environment 200 for approval and execution of restricted operations submitted by a user device 210, according to one or more embodiments of the disclosure. As shown in FIG. 2, the exemplary user device 210 initially provides a request during step 1 to perform a restricted operation to a restricted operation execution system 240.

The exemplary restricted operation execution system 240 processes the received request and provides a redirection request to the user device 210 during step 2 with a protected request, discussed below. The user device 210 then provides the redirection request to a restricted operation approval system 240 during step 3 with the protected request.

The exemplary restricted operation approval system 240 processes the received redirection request, following an approval process discussed further below, and, if approved, returns a protected request approval (e.g., with a one-time approval token) during step 4 to the user device 210 to be used for execution of the requested restricted operation. Finally, the user device 210 provides the protected request approval with the one-time approval token during step 5 to the restricted operation execution system 240 for execution of the restricted operation.

The functions and messages illustrated in FIG. 2 are discussed further below in conjunction with FIGS. 3 through 9.

Figure 3:
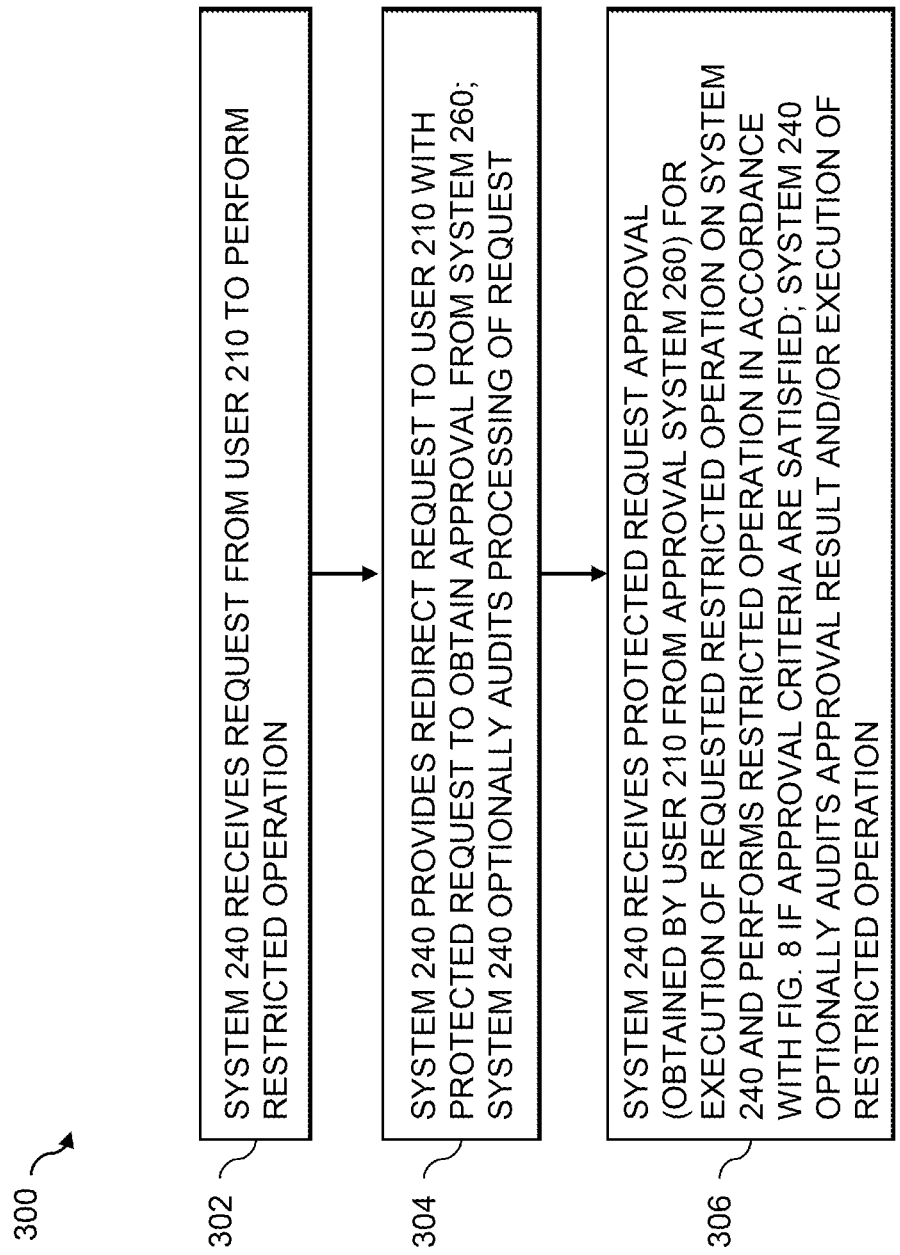
FIG. 3 is a flow chart illustrating an exemplary implementation of a restricted operation approval and execution process, according to one embodiment of the disclosure.

FIG. 3 is a flow chart illustrating an exemplary implementation of a restricted operation approval and execution process 300, according to one embodiment of the disclosure. In the example of FIG. 3, the steps of the exemplary restricted operation approval and execution process 300 are from the perspective of the restricted operation execution system 240. As shown in FIG. 3, the exemplary restricted operation execution system 240 initially receives a request from the user device 210 during step 302 to perform a restricted operation.

The restricted operation execution system 240 then provides a redirect request to the user device 210 during step 304 with a protected request in order for the user device 210 to obtain an approval from the restricted operation approval system 240. In addition, the restricted operation execution system 240 optionally also audits the processing of the request during step 304.

Figure 8:
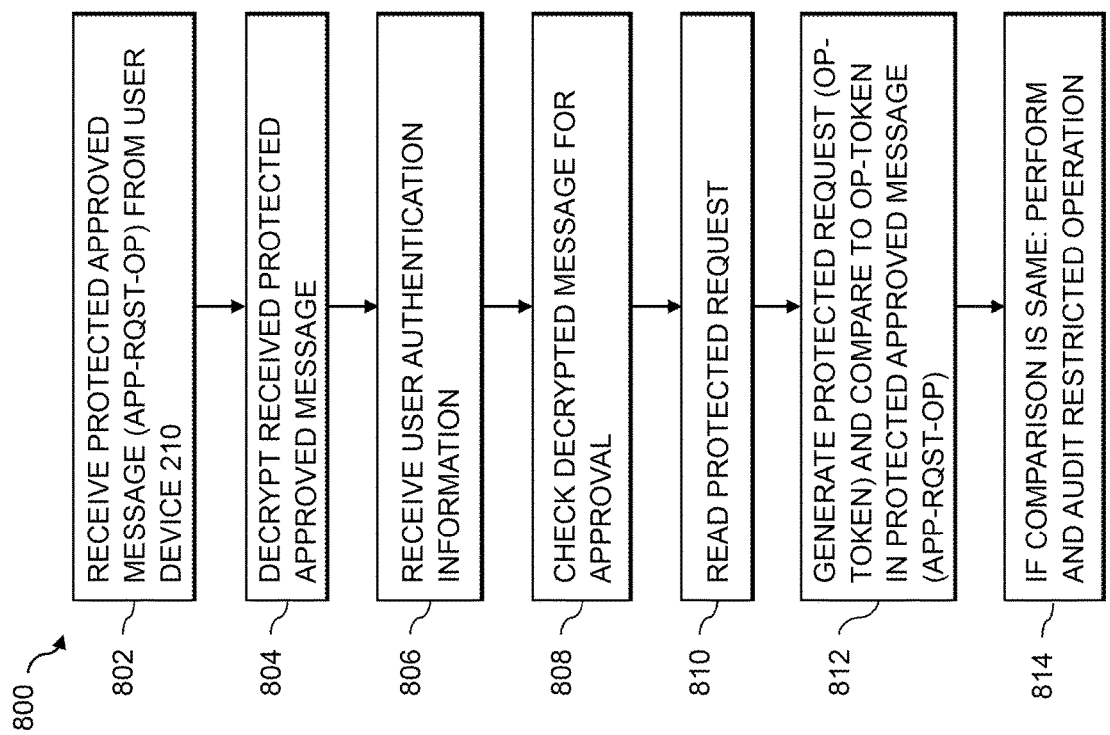
FIG. 8 is a flow chart illustrating an exemplary implementation of a restricted operation request execution process, according to at least one embodiment of the disclosure.

During step 306, the restricted operation execution system 240 receives a protected request approval from the user device 210 (obtained from the restricted operation approval system 240) for execution of the requested restricted operation on the restricted operation execution system 240 and performs the restricted operation in accordance with FIG. 8 if one or more predefined approval criteria are satisfied. In addition, the restricted operation execution system 240 optionally also audits the approval or disapproval, as well as execution of the restricted operation (if approved) during step 306. Any references herein to optional steps or elements should not be construed to suggest that other steps or elements are required in other embodiments.

Figure 4:
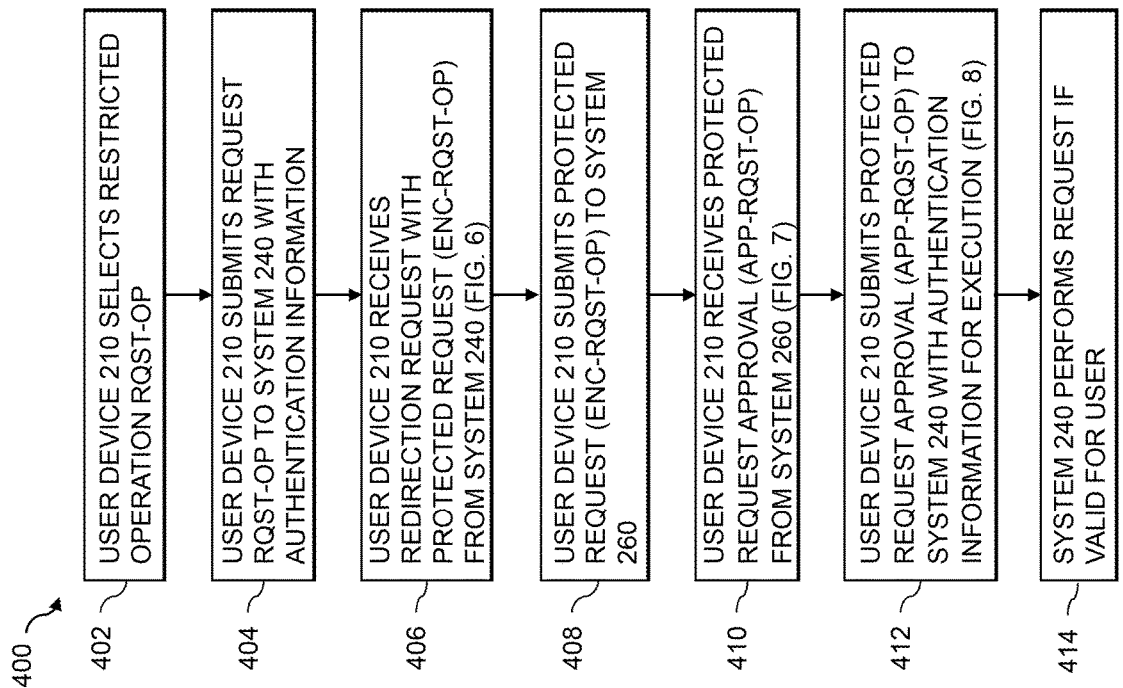
FIG. 4 is a flow chart illustrating an exemplary implementation of a restricted operation approval and execution process, according to some embodiments.

FIG. 4 is a flow chart illustrating an exemplary implementation of a restricted operation approval and execution process 400, according to some embodiments. In the example of FIG. 4, the steps of the exemplary restricted operation approval and execution process 400 are from the perspective of the user device 210. As shown in FIG. 4, during step 402, a user executing an exemplary user device 210 selects a restricted operation (RQST-OP) to execute, for example, from a presented list (e.g., on a pulldown menu).

The user device 210 then submits the request RQST-OP during step 404 to the restricted operation execution system 240 with authentication information of the user (e.g., a passphrase, a biometric sample and/or a smart card). Following an evaluation process executed by the restricted operation execution system 240, discussed further below, the user device 210 receives a redirection request with a protected request (ENC-RQST-OP) from the restricted operation execution system 240 during step 406, as discussed further below in conjunction with FIG. 6.

During step 408, the exemplary user device 210 submits the protected request (ENC-RQST-OP) to the restricted operation approval system 240. Following an approval process, the user device 210 receives a protected request approval (APP-RQST-OP) from the restricted operation approval system 240 during step 410, as discussed further below in conjunction with FIG. 7.

The exemplary user device 210 submits the protected request approval (APP-RQST-OP) during step 412 with the authentication information to the restricted operation execution system 240 for execution, as discussed further below in conjunction with FIG. 8.

Finally, during step 414, the exemplary restricted operation execution system 240 performs the request if the request is determined by the restricted operation execution system 240 to be valid for the particular user.

Figure 5:
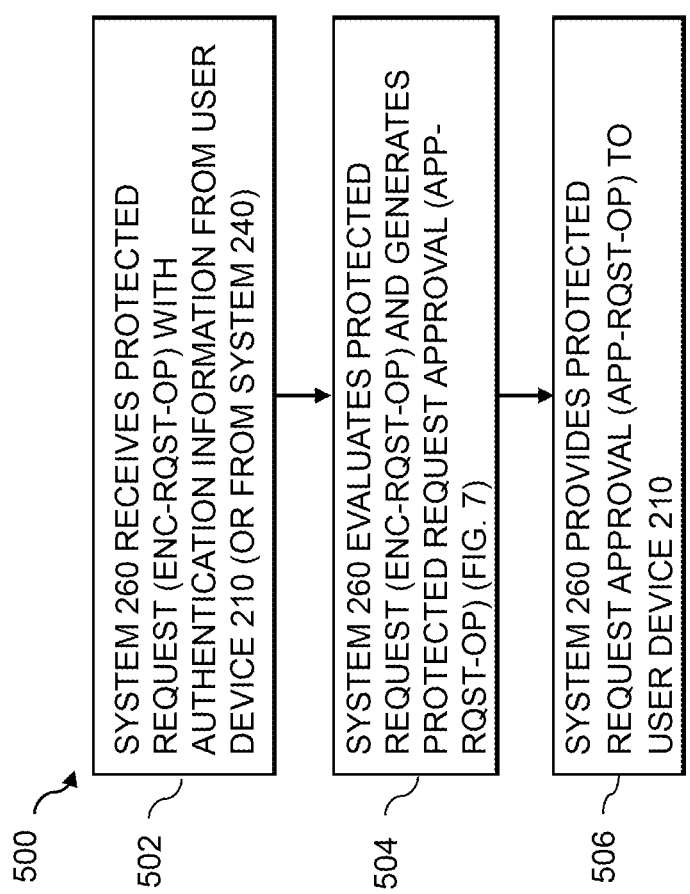
FIG. 5 is a flow chart illustrating an exemplary implementation of a restricted operation approval process, according to some embodiments.

FIG. 5 is a flow chart illustrating an exemplary implementation of a restricted operation approval process 500, according to some embodiments. In the example of FIG. 5, the steps of the exemplary restricted operation approval process 500 are from the perspective of the restricted operation approval system 240. As shown in FIG. 5, during step 502, the exemplary restricted operation approval system 240 receives the protected request (ENC-RQST-OP), for example, with the authentication information, from the user device 210. In alternate embodiments, the restricted operation execution system 240 may provide the request directly to the restricted operation approval system 240.

The exemplary restricted operation approval system 240 then evaluates the protected request during step 504 and generates a protected request approval (APP-RQST-OP), as discussed further below in conjunction with FIG. 7. Finally, the exemplary restricted operation approval system 240 provides the protected request approval to the user device 210 during step 506.

Figure 6:
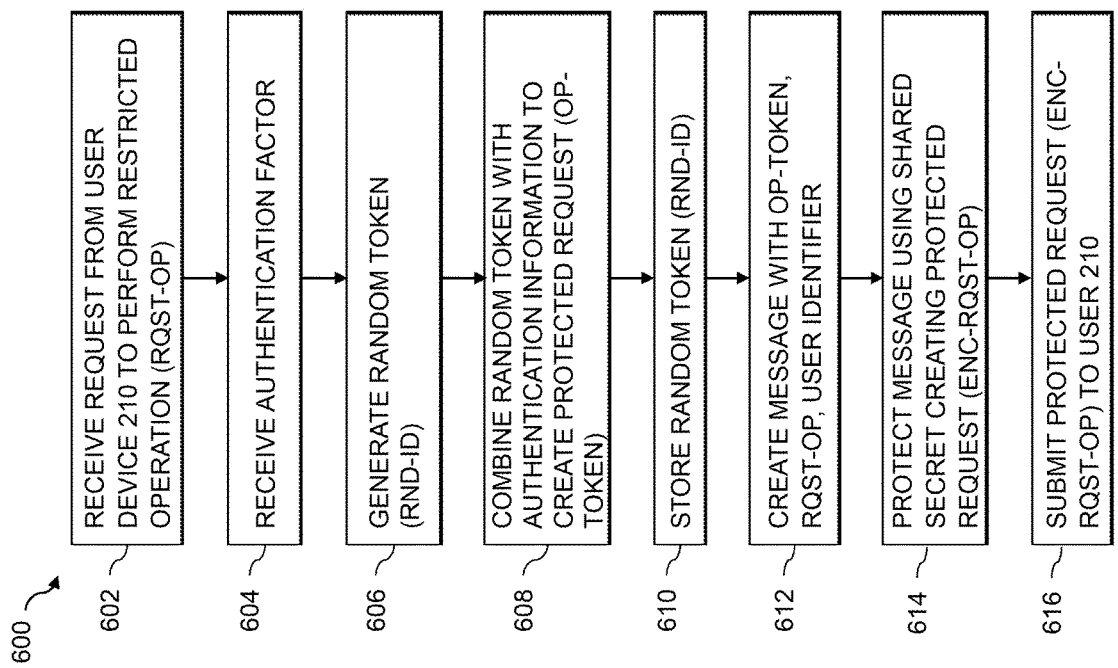
FIG. 6 is a flow chart illustrating an exemplary implementation of a restricted operation request evaluation process, according to an embodiment of the disclosure.

FIG. 6 is a flow chart illustrating an exemplary implementation of a restricted operation request evaluation process 600, according to an embodiment of the disclosure. In the example of FIG. 6, the steps of the exemplary restricted operation request evaluation process 600 are from the perspective of the restricted operation execution system 240. As shown in FIG. 6, a request is received during step 602 from a user device 210 to perform a restricted operation (RQST-OP). In addition, during step 604 an authentication factor (e.g., the authentication information, such as a passphrase, biometric sample or a smart card) is received from the user device 210.

During step 606, the exemplary restricted operation request evaluation process 600 generates a random token (RND-ID), and combines the random token (RND-ID) during step 608 with the authentication information received during step 604 to create a protected request comprising an output token (OP-TOKEN). In some embodiments, the protected request and the authentication information can be combined using a hash function.

The exemplary restricted operation request evaluation process 600 then stores the random token (RND-ID) during step 610, for example, in the restricted operation database 106 and creates a message during step 612 with the protected request (OP-TOKEN), requested restricted operation (RQST-OP) and an identifier of the user.

During step 614, the exemplary restricted operation request evaluation process 600 protects the message created during step 612 using a shared secret, to create a protected request (ENC-RQST-OP) and submits the protected request (ENC-RQST-OP) to the user device 210 during step 616.

Figure 7:
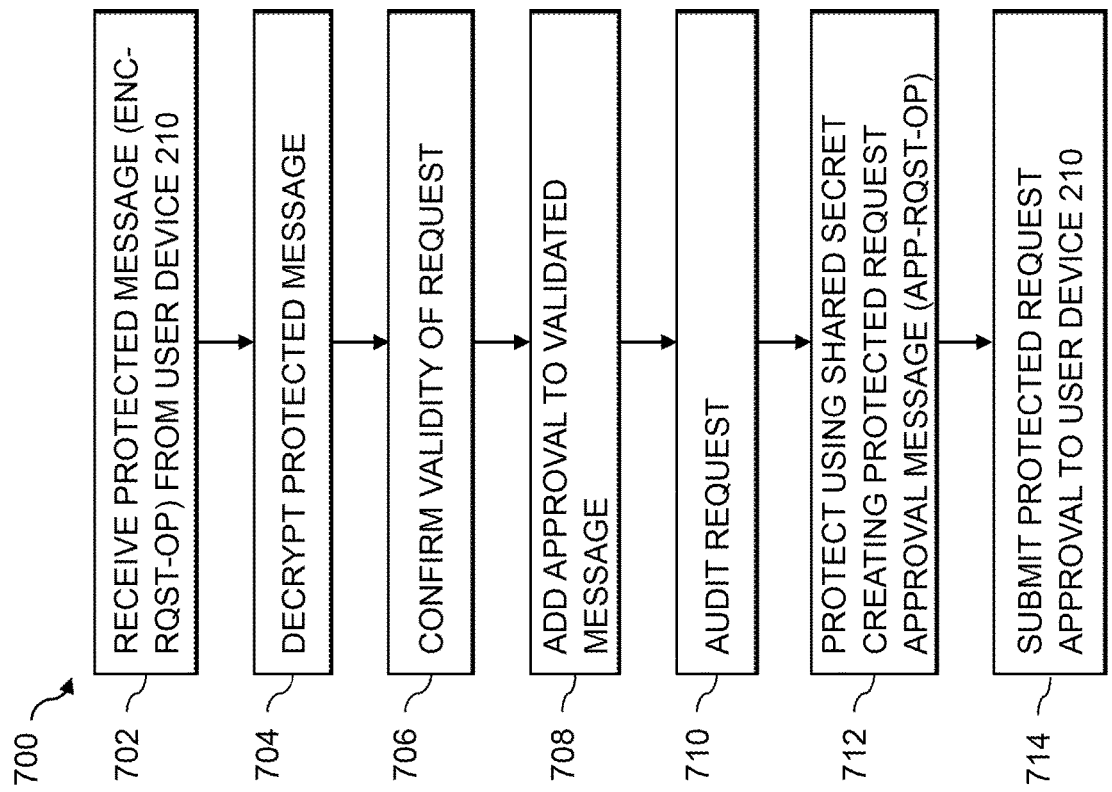
FIG. 7 is a flow chart illustrating an exemplary implementation of a protected request approval generation process, according to some embodiments.

FIG. 7 is a flow chart illustrating an exemplary implementation of a protected request approval generation process 700, according to some embodiments. In the example of FIG. 7, the steps of the exemplary protected request approval generation process 700 are from the perspective of the restricted operation approval system 240. As shown in FIG. 7, the exemplary protected request approval generation process 700 is initiated during step 702 upon receipt of a protected message (ENC-RQST-OP). During step 704, the protected message (ENC-RQST-OP) is decrypted (or confirm digital signature) and a validity of the decrypted protected message (ENC-RQST-OP) is evaluated during step 706.

Once the validity of the protected message (ENC-RQST-OP) is established, an approval is added to the validated message during step 708. The request is optionally audited during step 710, for example, by recording predefined features of the request in an audit log. The auditing may also record a disposition status for the request, such as an approved or denied status.

During step 712, the exemplary protected request approval generation process 700 protects the approved message generated during step 708 using a shared secret (e.g., using an encryption or digital signature technique), and submits the protected request approval (APP-RQST-OP) to the user device 210 during step 714.

FIG. 8 is a flow chart illustrating an exemplary implementation of a restricted operation request execution process 800, according to at least one embodiment of the disclosure. In the example of FIG. 8, the steps of the exemplary restricted operation request execution process 800 are from the perspective of the restricted operation execution system 240. As shown in FIG. 8, during step 802, the exemplary restricted operation request execution process 800 receives a protected approved message (APP-RQST-OP).

During step 804, the exemplary restricted operation request execution process 800 decrypts (or confirms digital signature) the received protected approved message and receives the user authentication information (e.g., a passphrase (PP)) from the user device 210 during step 806.

During step 808, the exemplary restricted operation request execution process 800 checks the decrypted message for an approval, and reads the protected request from the decrypted message during step 810.

The exemplary restricted operation request execution process 800 generates a protected request (OP-TOKEN) during step 812 and then compares the generated protected request to the protected request (OP-TOKEN) in the received protected request approval (APP-RQST-OP). Finally, if it is determined during step 812 that the comparison is the same, the exemplary restricted operation request execution process 800 performs and audits the restricted operation during step 814.

Figure 9:
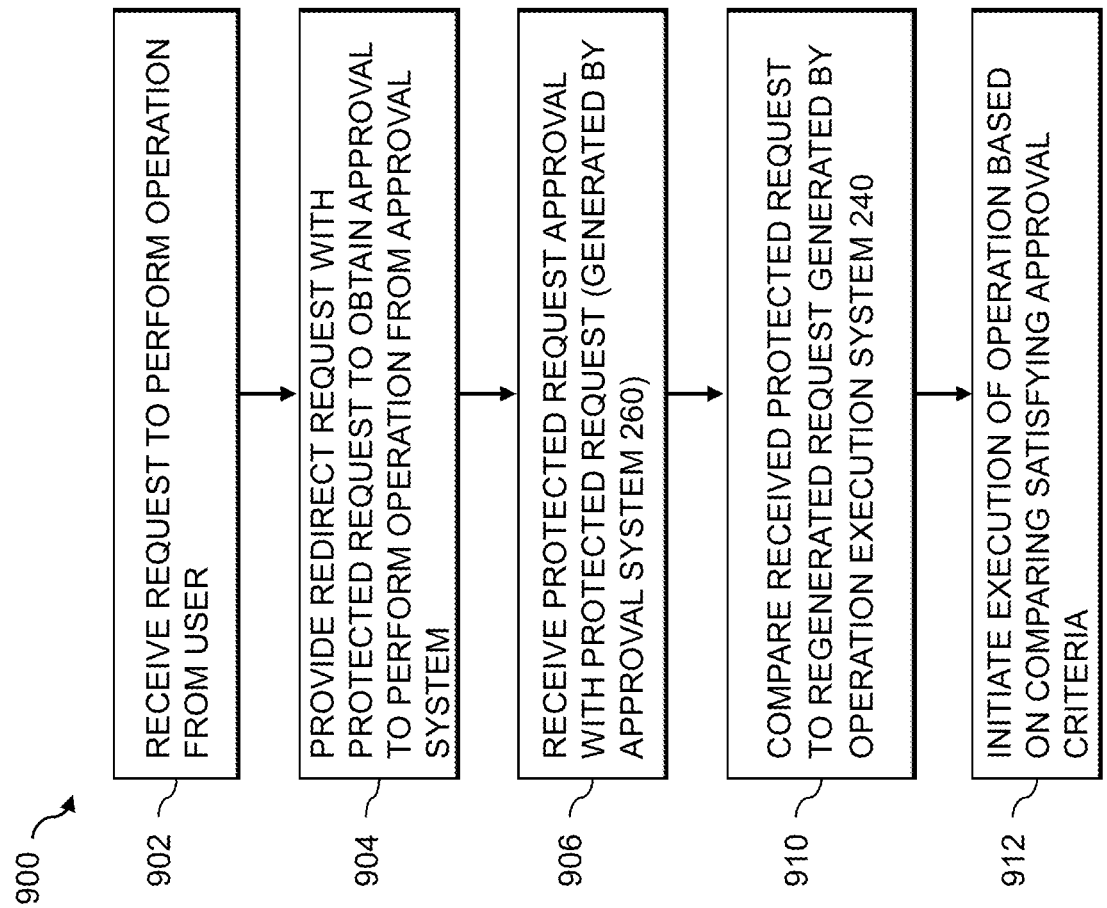
FIG. 9 is a flow chart illustrating an exemplary implementation of a restricted operation approval and execution process, according to one embodiment of the disclosure.

FIG. 9 is a flow chart illustrating an exemplary implementation of a restricted operation approval and execution process 900, according to one embodiment of the disclosure.

As shown in FIG. 9, the exemplary restricted operation approval and execution process 900 initially receives a request to perform an operation from a user during step 902. During step 904, the exemplary operation approval and execution process 900 provides a redirect request (e.g., to user device 210 or directly to restricted operation approval system 240) with a protected request to obtain an approval to perform the operation from the restricted operation execution system 240. In at least some embodiments, the protected request comprises a random token combined with authentication information from the user, which is then protected by the restricted operation execution system 240 using an encryption and/or a digital signature with a shared secret (e.g., a shared symmetric key or an asymmetric key-pair) and the user authentication information.

During step 906, the exemplary operation approval and execution process 900 receives a protected request approval (e.g., from the user device 210 or directly from the restricted operation approval system 240) with the protected request. The received protected request is compared during step 910 to a regenerated request generated by the restricted operation execution system 240 using the authentication information of the user and the encryption and/or the digital signature based on the shared secret. The comparison may include, without limitation, a comparison of the regenerated request to the received approval and/or comparing the protected request approval to other data stored with the generated random token.

Finally, during step 912, an execution of the operation is initiated in response to the comparing satisfying one or more approval criteria.

The particular processing operations and other network functionality described in conjunction with the flow diagrams of FIGS. 2 through 9 are presented by way of illustrative example only, and should not be construed as limiting the scope of the disclosure in any way. Alternative embodiments can use other types of processing operations to approve and execute restricted operations. For example, the ordering of the process steps may be varied in other embodiments, or certain steps may be performed concurrently with one another rather than serially. In another aspect, the process can skip one or more of the actions. In other aspects, one or more of the actions are performed simultaneously. In some aspects, additional actions can be performed.

Among other benefits, the disclosed techniques for approval and execution of restricted operations enable the execution of a restricted command while also reducing liability by requiring protection (for example, by a password) that is never revealed to the enabling entity (e.g., the restricted operation approval server 160) and also optionally logs the person asking for the permission.

One or more embodiments of the disclosure provide improved methods, apparatus and computer program products for approval and execution of restricted operations. The foregoing applications and associated embodiments should be considered as illustrative only, and numerous other embodiments can be configured using the techniques disclosed herein, in a wide variety of different applications.

It should also be understood that the disclosed restricted operation approval and execution techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for approval and execution of restricted operations may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based restricted operation approval and execution engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based restricted operation approval and execution platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
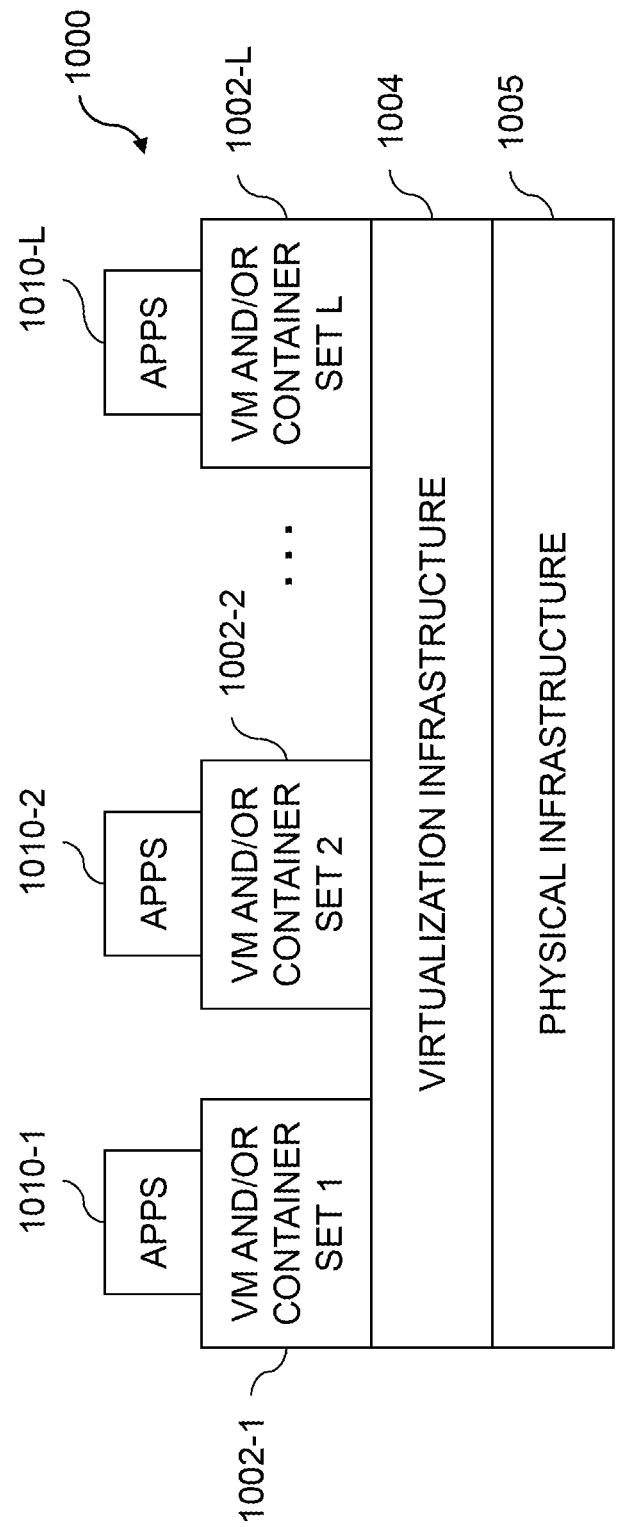
FIG. 10 illustrates an exemplary processing platform that may be used to implement at least a portion of one or more embodiments of the disclosure comprising a cloud infrastructure.

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide restricted operation approval and execution functionality of the type described above for one or more processes running on a given one of the VMs. For example, each of the VMs can implement restricted operation approval control logic and associated restricted operation execution functions for providing restricted operation approval and execution functionality for one or more processes running on that particular VM.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide restricted operation approval and execution functionality of the type described above for one or more processes running on different ones of the containers. For example, a container host device supporting multiple containers of one or more container sets can implement one or more instances of restricted operation approval control logic and associated restricted operation execution functions for providing restricted operation approval and execution functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an application specific integrated circuit (ASIC), a field programmable gate array (FPGA) or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Figure 11:
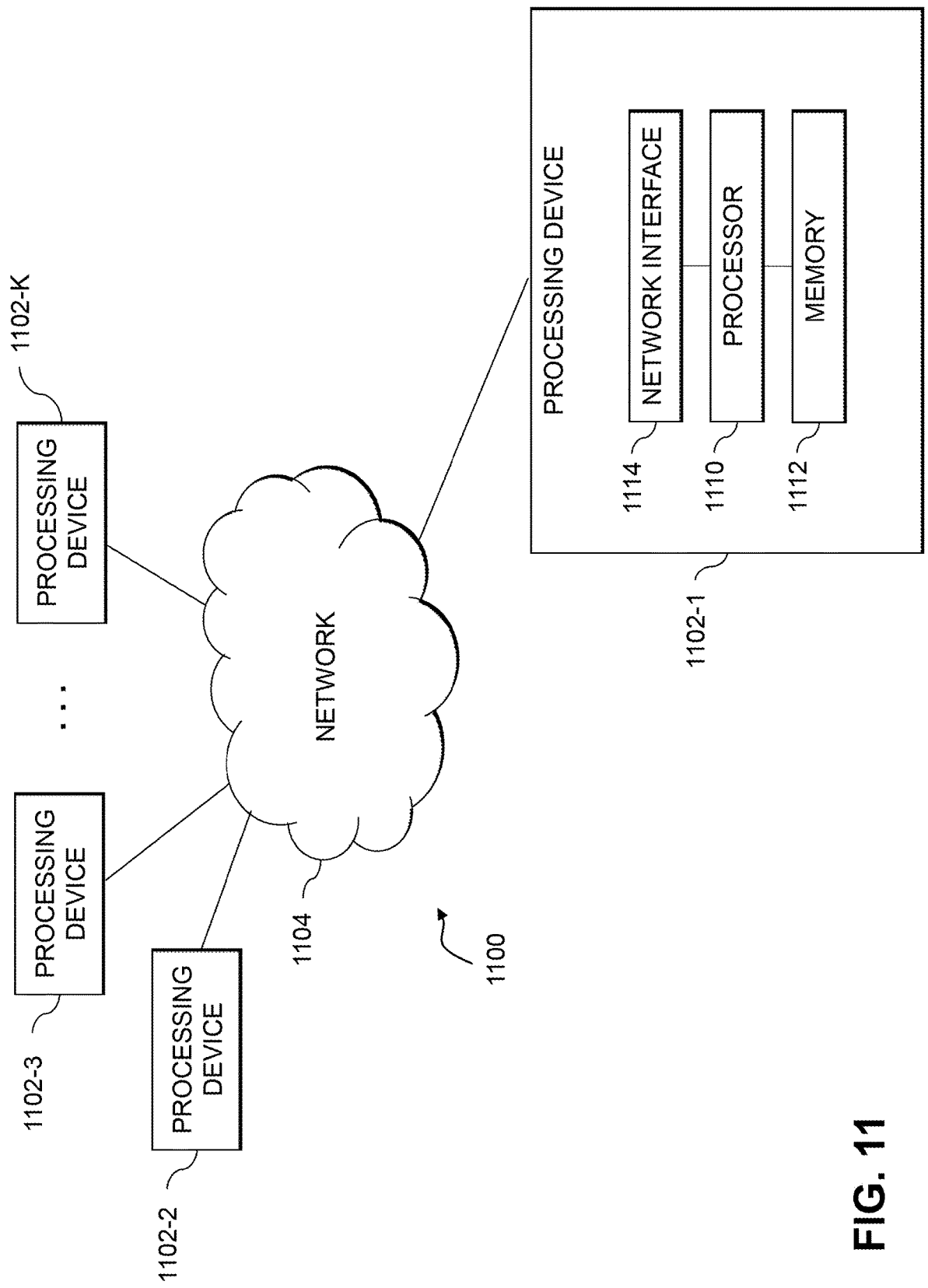
FIG. 11 illustrates another exemplary processing platform that may be used to implement at least a portion of one or more embodiments of the disclosure.

Multiple elements of an information processing system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   receiving a request to perform an operation from a user;
   providing a redirect request with a protected request to obtain approval to perform the operation from an approval system, wherein the protected request comprises a random token combined with user authentication information that is protected using one or more of an encryption and a digital signature with a shared secret;
   receiving a protected request approval with the protected request, wherein the protected request approval was generated by the approval system using the shared secret;
   comparing the received protected request to a regenerated request generated using the user authentication information and one or more of the encryption and the digital signature with the shared secret; and
   initiating an execution of the operation in response to the comparing satisfying one or more approval criteria, wherein the method is performed by at least one processing device comprising a processor coupled to a memory.

2. The method of claim 1, wherein the receiving the request to perform the operation further comprises the user selecting the operation and providing the request to perform the selected operation.

3. The method of claim 2, wherein the receiving the request to perform the operation further comprises one or more of initiating an authentication of the user, obtaining a secret pass phrase from the user and receiving an authentication factor from the user.

4. The method of claim 1, wherein the providing the redirect request with the protected request further comprises auditing the approval of the request.

5. The method of claim 1, wherein the protected request is one or more of encrypted and digitally signed using one or more of a shared key, an identifier of the user, an identifier of the operation and the user authentication information.

6. The method of claim 1, wherein the shared secret is shared between an operation execution system and the approval system.

7. The method of claim 1, wherein the initiating the execution of the requested operation further comprises auditing the execution of the requested operation.

8. An apparatus comprising:
   at least one processing device comprising a processor coupled to a memory;
   the at least one processing device being configured to implement the following steps:
   receiving a request to perform an operation from a user;
   providing a redirect request with a protected request to obtain approval to perform the operation from an approval system, wherein the protected request comprises a random token combined with user authentication information that is protected using one or more of an encryption and a digital signature with a shared secret;
   receiving a protected request approval with the protected request, wherein the protected request approval was generated by the approval system using the shared secret;
   comparing the received protected request to a regenerated request generated using the user authentication information and one or more of the encryption and the digital signature with the shared secret; and
   initiating an execution of the operation in response to the comparing satisfying one or more approval criteria.

9. The apparatus of claim 8, wherein the receiving the request to perform the operation further comprises the user selecting the operation and providing the request to perform the selected operation.

10. The apparatus of claim 9, wherein the receiving the request to perform the operation further comprises one or more of initiating an authentication of the user, obtaining a secret pass phrase from the user and receiving an authentication factor from the user.

11. The apparatus of claim 8, wherein the providing the redirect request with the protected request further comprises auditing the approval of the request.

12. The apparatus of claim 8, wherein the protected request is one or more of encrypted and digitally signed using one or more of a shared key, an identifier of the user and an identifier of the operation.

13. The apparatus of claim 8, wherein the shared secret is shared between an operation execution system and the approval system.

14. The apparatus of claim 8, wherein the initiating the execution of the requested operation further comprises auditing the execution of the requested operation.

15. A non-transitory processor-readable storage medium having stored therein program code of one or more software programs, wherein the program code when executed by at least one processing device causes the at least one processing device to perform the following steps:
   receiving a request to perform an operation from a user;
   providing a redirect request with a protected request to obtain approval to perform the operation from an approval system, wherein the protected request comprises a random token combined with user authentication information that is protected using one or more of an encryption and a digital signature with a shared secret;

receiving a protected request approval with the protected request, wherein the protected request approval was generated by the approval system using the shared secret;

comparing the received protected request to a regenerated request generated using the user authentication information and one or more of the encryption and the digital signature with the shared secret; and initiating an execution of the operation in response to the comparing satisfying one or more approval criteria.

16. The non-transitory processor-readable storage medium of claim 15, wherein the receiving the request to perform the operation further comprises the user selecting the operation and providing the request to perform the selected operation.

17. The non-transitory processor-readable storage medium of claim 15, wherein the providing the redirect request with the protected request further comprises auditing the approval of the request.

18. The non-transitory processor-readable storage medium of claim 15, wherein the protected request is one or more of encrypted and digitally signed using one or more of a shared key, an identifier of the user, an identifier of the operation and the user authentication information.

19. The non-transitory processor-readable storage medium of claim 15, wherein the shared secret is shared between an operation execution system and the approval system.

20. The non-transitory processor-readable storage medium of claim 15, wherein the initiating the execution of the requested operation further comprises auditing the execution of the requested operation.

* * * * *